(12) United States Patent
Wu

(10) Patent No.: US 10,531,140 B2
(45) Date of Patent: Jan. 7, 2020

(54) GEOGRAPHICAL POSITION INFORMATION-BASED INTERACTION METHOD, CLOUD SERVER, PLAYBACK DEVICE AND SYSTEM

(71) Applicant: Songpo Wu, Haikou (CN)

(72) Inventor: Songpo Wu, Haikou (CN)

( * ) Notice: Subject to any disclaimer, the term of this patent is extended or adjusted under 35 U.S.C. 154(b) by 0 days.

(21) Appl. No.: 15/728,409

(22) Filed: Oct. 9, 2017

(65) Prior Publication Data

US 2018/0035144 A1 Feb. 1, 2018

Related U.S. Application Data

(63) Continuation of application No. PCT/CN2016/078839, filed on Apr. 8, 2016.

(30) Foreign Application Priority Data

Apr. 10, 2015 (CN) .......................... 2015 1 0167147
Jul. 26, 2015 (CN) .......................... 2015 1 0471549

(51) Int. Cl.
*H04N 21/258* (2011.01)
*H04W 4/029* (2018.01)
(Continued)

(52) U.S. Cl.
CPC ... *H04N 21/25841* (2013.01); *H04N 21/4316* (2013.01); *H04W 4/029* (2018.02)

(58) Field of Classification Search
CPC ......... H04N 21/25841; H04N 21/8126; H04N 21/4882; H04N 21/8545; H04N 21/4316; H04L 67/18; H04W 4/02
See application file for complete search history.

(56) References Cited

U.S. PATENT DOCUMENTS

2013/0210461 A1\* 8/2013 Moldavsky ........ G06Q 30/0261
455/456.3
2013/0217332 A1\* 8/2013 Altman .................. H04H 60/90
455/41.2
(Continued)

FOREIGN PATENT DOCUMENTS

CN 101256660 9/2008
CN 103516768 1/2014
(Continued)

OTHER PUBLICATIONS

International Searching Authority, International Search Report, issued in connection with International Application No. PCT/CN2016/078839, dated Jun. 28, 2016, 5 pages.

*Primary Examiner* — Benjamin R Bruckart
*Assistant Examiner* — Aklil M Tesfaye
(74) *Attorney, Agent, or Firm* — Hanley, Flight & Zimmerman, LLC

(57) ABSTRACT

This invention discloses one interaction method, cloud server, broadcast device and system based on geographic position information. Said interaction method comprises: the cloud server generates the corresponding multiple interactive texts for the various geographic position coordinates, selects all the interactive texts that have the first relevancy with the geographic position coordinates of the broadcast device; the broadcast device selects the interactive texts in the same quantity as the identified interactive content; the cloud server checks the presence of any interactive text that is the same as the interactive text in the interactive text input information in the interactive text that has the second relevancy with the geographic position coordinate of the terminal; if it is present, it will transmit the terminal's communication address and interactive text input information to the corresponding broadcast device according to the
(Continued)

ID of the broadcast device having the third relevancy with said same interactive text.

8 Claims, 3 Drawing Sheets

(51) Int. Cl.
　　　*H04N 21/431*　　　(2011.01)
　　　*H04N 21/488*　　　(2011.01)
　　　*H04N 21/81*　　　(2011.01)
　　　*H04L 29/08*　　　(2006.01)

(56) References Cited

U.S. PATENT DOCUMENTS

| | | | |
|---|---|---|---|
| 2014/0004884 A1 | 1/2014 | Chang et al. | |
| 2014/0171129 A1* | 6/2014 | Benzatti | H04W 4/025 |
| | | | 455/457 |
| 2014/0214924 A1* | 7/2014 | Cha | H04N 21/41407 |
| | | | 709/203 |
| 2014/0274031 A1* | 9/2014 | Menendez | H04W 52/0209 |
| | | | 455/426.1 |
| 2015/0087339 A1 | 3/2015 | Kuhlmann | |
| 2015/0094097 A1 | 4/2015 | Fracccaroli | |
| 2015/0288760 A1* | 10/2015 | Thomas | H04L 67/1095 |
| | | | 709/203 |
| 2016/0174064 A1* | 6/2016 | Brinskele | H04W 8/20 |
| | | | 455/414.1 |

FOREIGN PATENT DOCUMENTS

| | | |
|---|---|---|
| CN | 104079471 | 10/2014 |
| CN | 104504019 | 4/2015 |

\* cited by examiner

GEOGRAPHICAL POSITION INFORMATION-BASED INTERACTION METHOD, CLOUD SERVER, PLAYBACK DEVICE AND SYSTEM

CROSS REFERENCE TO RELATED APPLICATIONS

This patent arises from an application that is a continuation of PCT/CN2016/078839, filed Apr. 8, 2016, which claims priority to Chinese patent application 201510167147.4, dated Apr. 10, 2015; and claims priority to Chinese patent application 201510471549.3, dated Jul. 26, 2015; and all contents of the foregoing application cases are incorporated by reference.

TECHNICAL FIELD

This invention relates to screen information interaction technology, particularly one interaction method, cloud server, broadcast device and system based on geographic position information.

BACKGROUND

In reality, a user normally needs to use a cell phone, a tablet computer or another terminal to scan a QR code on TV to acquire the interactive information and have interactions. Under most circumstances, however, it is inconvenient for a user to scan a QR code and acquire the interactive information, e.g. the user can't approach the TV for the scanning if the TV is deposited at a high position. Moreover, the image containing a QR code normally disappears quickly so that the user normally has no time to scan the QR code.

On the other hand, a user must record the content and make the search when he/she sees something interested on a broadcast device and intends to acquire further data relating to the broadcast content. He/she can't acquire such data on a real-time and direct basis.

SUMMARY

In order to solve the foregoing technical issues, this invention discloses one interaction method, cloud server, broadcast device and system based on geographic position information so that the user can rapidly and conveniently acquire the interactive information on the broadcast device.

On the one hand, this invention provides one interaction method based on geographic position data. Said interaction method comprises:

the cloud server has the various geographic position coordinates in the geographic position coordinate database thereof as the central points, generates the corresponding multiple interactive texts for each geographic position coordinate within the preset geographic scope of the valid interactions, and establishes the first relevancy between said interactive texts and the corresponding geographic position coordinate and the second relevancy between said interactive texts and all the geographic position coordinates within said preset geographic scope of the valid interactions;

said cloud server receives the interactive text request message from the broadcast device; said interactive text request message comprises the geographic position coordinate of the broadcast device, the preset quantity of interactive texts and the ID of the broadcast device;

according to the geographic position coordinate information in said interactive text request message, said cloud server selects all the interactive texts that have the first relevancy with the geographic position coordinates of the broadcast device from said geographic position coordinate database, and selects therefrom the interactive texts of a preset quantity that do not have relevancy with the ID of other broadcast devices, establishes the third relevancy between the selected interactive texts and the ID of the broadcast device and transmits them to said broadcast device;

said broadcast device receives the interactive texts of the preset quantity and stores them in the interactive text storage;

said broadcast device acquires the video data; said video data comprises video image data and multiple interactive contents; said interactive content comprises interactive information, display time of interactive text, first retained relevancy time of the interactive text and the coordinate information of display position, wherein the interactive contents are edited on the time point of the broadcast time axis of said video data;

when said broadcast device is broadcasting said video data and reaches the time point when said interactive content is edited, it will check the interactive content at the time point, select the interactive texts in the same quantity as the identified interactive content from said interactive text storage and establish the fourth relevancy with the identified content; according to the displayed position coordinate information, it will display the interactive text having the fourth relevancy with the identified interactive content at the corresponding position on the screen of said broadcast device; when the display time of said interactive texts is the same as the display time of the interactive content having the fourth relevancy therewith, the display of such interactive text on the screen will be terminated; when the relevancy time of said interactive texts reaches the first retained relevancy time of the interactive content having the fourth relevancy therewith, the relevancy between said interactive text and said interactive content will be cancelled;

said cloud server receives from the terminal the interactive text input command that comprises the interactive text input information, terminal's geographic position coordinate and communication address, and checks the presence of any interactive text that is the same as the interactive text in said interactive text input information in the interactive text that has the second relevancy with the geographic position coordinate of the terminal; if it is present, it will transmit said terminal's communication address and interactive text input information to the corresponding broadcast device according to the ID of the broadcast device having the third relevancy with said same interactive text;

said broadcast device transmits to said terminal the interactive information in the interactive content having relevancy with the interactive text in said interactive text input information according to the communication address of said terminal;

said terminal receives said interactive information and performs the corresponding operations and display according to the type of the interactive information.

In one embodiment, said interaction method further comprises: said broadcast device displays the geographic scope of valid interaction of the interactive text shown on the screen beside the display position of said interactive text on the screen.

In one embodiment, the multiple interactive texts generated within the preset geographic scope of valid interaction corresponding to various geographic position coordinates are exclusive, as against the interactive texts that have the second relevancy with all the geographic position coordinates within said geographic scope of valid interaction.

In one embodiment, said interaction method further comprises: said cloud server sets one valid display scope for the interactive texts having the first relevancy with the various geographic position coordinates in said geographic position coordinate database and the valid display scope of each interactive text is within the geographic scope of valid interaction corresponding to such interactive text; when the geographic position coordinate of said broadcast device is beyond the valid display scope of the interactive text currently on display, said broadcast device will terminate display of the interactive text currently on display.

In one embodiment, said interaction method further comprises: said cloud server sets one second retained relevancy time for the interactive texts having the first relevancy with the various geographic position coordinates in said geographic position coordinate database; when the geographic position coordinate of said broadcast device is beyond the valid display scope of the interactive text currently on display, the third relevancy will be retained between the interactive text currently on display and the ID of said broadcast device within said second retained relevancy time.

In one embodiment, said interaction method further comprises: said cloud server monitors changes in the geographic position coordinate of said broadcast device on a real-time basis, when the geographic position coordinate of said broadcast device is beyond the valid display scope of the interactive text in said interactive text storage, it will identify the relevancy state of various interactive texts in said interactive text storage;

where the interactive text in said interactive text storage is related to the interactive content in the video data being broadcast and is being displayed on the screen, the third relevancy will be retained between the interactive text currently on display and the ID of said broadcast device within said second retained relevancy time and one relevancy retention command and one first interactive text updating message will be sent to said broadcast device; said broadcast device receives the relevancy retention command and the first interactive text updating message, establishes relevancy between said first interactive text updating message and the interactive content in the video data being broadcast and displays it on the screen, and according to said relevancy retention command, it retains the relevancy between said interactive content and the previous interactive text and cancels the display of the previous interactive text on the screen; wherein said first interactive text updating message is the interactive text having the third relevancy with the ID of said broadcast device, such interactive text is selected by said cloud server from the multiple interactive texts having the first relevancy with the current geographic position coordinate in said geographic position coordinate database according to the current geographic position coordinate of said broadcast device;

if the display of the interactive texts in said interactive text storage is already terminated but they still retain relevancy with the interactive content in the video data currently on display, the third relevancy between the interactive text of said interactive text storage and the ID of said broadcast device will be retained within said second relevancy retention time;

if the interactive text in said interactive text storage has no relevancy with the interactive content in the video data currently on display, the third relevancy between the interactive text in said interactive text storage and the ID of said broadcast device will be cancelled, meanwhile, one text replacement command and one second interactive text updating message will be sent to said broadcast device; said broadcast device uses said second interactive text updating message to replace the interactive text stored in said interactive text storage according to said text replacement command, wherein said second interactive text updating message is the interactive text having the third relevancy with the ID of said broadcast device, such interactive text is selected by said cloud server from the multiple interactive texts having the first relevancy with the current geographic position coordinate in said geographic position coordinate database according to the current geographic position coordinate of said broadcast device.

In one embodiment, said geographic position coordinate comprises: longitudinal and latitudinal coordinates and altitude data.

In one embodiment, said interactive text includes at least one of figures, letters and characters.

On the other hand, this invention provides one cloud server, said cloud server comprises:

a geographic position coordinate database, configured to store all the geographic position coordinate information within the target area, including the geographic position coordinate information of all broadcast devices within the target area;

an interactive text generating and relating unit, configured to have the various geographic position coordinates in the geographic position coordinate database thereof as the central points, generate the corresponding multiple interactive texts for each geographic position coordinate within the preset geographic scope of the valid interactions, and establish the first relevancy between said interactive texts and the corresponding geographic position coordinate and the second relevancy between said interactive texts and all the geographic position coordinates within said preset geographic scope of the valid interactions;

an interactive text request receiving unit, configured to receive the interactive text request message from the broadcast device; said interactive text request message comprises the geographic position coordinate of said broadcast device, the preset quantity of interactive texts and the ID of the broadcast device;

an interactive text selecting unit, configured to select all the interactive texts that have the first relevancy with the geographic position coordinates of the broadcast device from said geographic position coordinate database, select therefrom the interactive texts of a preset quantity that do not have relevancy with the ID of other broadcast devices, establish the third relevancy between the selected interactive texts and the ID of the broadcast device and transmit them to said broadcast device;

an interactive text transmitting unit, configured to transmit the selected interactive texts of the preset quantity to said broadcast device;

a terminal communication unit, configured to receive from the terminal the interactive text input command that comprises the interactive text input information, terminal's geographic position coordinate and communication address;

an inquiry unit, configured to check the presence of any interactive text that is the same as the interactive text in said interactive text input information in the interactive text that has the second relevancy with the geographic position coordinate of the terminal;

an information transmitting unit, configured to transmit said terminal's communication address and interactive text input information to the corresponding broadcast device according to the ID of the broadcast device having the third relevancy with said same interactive text if there is any interactive text that is the same as the interactive text in said interactive text input information.

In one embodiment, said cloud server further comprises: an interactive text source database, configured to provide the interactive texts when said interactive text generating and relating unit is generating the corresponding multiple interactive texts for each geographic position coordinate in said geographic position coordinate database.

In one embodiment, said cloud server comprises one valid display scope setting unit, configured to set one valid display scope for the interactive texts having the first relevancy with the various geographic position coordinates in said geographic position coordinate database, the valid display scope of each interactive text is within the geographic scope of valid interaction corresponding to the interactive text; when the geographic position coordinate of said broadcast device is beyond the valid display scope of the interactive text currently on display, said broadcast device will terminate display of the interactive text currently on display.

In one embodiment, said cloud server further comprises: a second retention time setting unit, configured to set one second retained relevancy time for the interactive texts having the first relevancy with the various geographic position coordinates in said geographic position coordinate database; when the geographic position coordinate of said broadcast device is beyond the valid display scope of the interactive text currently on display, the third relevancy will be retained between the interactive text currently on display and the ID of said broadcast device within said second retained relevancy time.

In one embodiment, said cloud server further comprises: a geographic position monitoring unit, configured to monitor any changes in the geographic position coordinate of the broadcast device on a real-time basis;

an interactive text relevancy state identifying unit, configured to identify the relevancy state of various interactive texts in said interactive text storage when the geographic position coordinate of said broadcast device is beyond the valid display scope of the interactive text in said interactive text storage.

In one embodiment, said cloud server further comprises: a first text updating unit, configured to retain the third relevancy between the interactive text currently on display and the ID of said broadcast device within said second relevancy retention time when the interactive text in said interactive text storage is related to the interactive content of the video data being broadcast and is being displayed on the screen, and also send one relevancy retention command and one first interactive text updating message to said broadcast device, wherein said first interactive text updating message is the interactive text having the third relevancy with the ID of said broadcast device; such interactive text is selected by said cloud server from the multiple interactive texts having the first relevancy with the current geographic position coordinate in said geographic position coordinate database according to the current geographic position coordinate of said broadcast device;

a second text updating unit, configured to retain the third relevancy between the interactive text of said interactive text storage and the ID of said broadcast device within said second relevancy retention time when the display of the interactive texts in said interactive text storage is already terminated but they still retain relevancy with the interactive content in the video data currently on display;

a third text updating unit, configured to cancel the third relevancy between the interactive text in said interactive text storage and the ID of said broadcast device and send one text replacement command and one second interactive text updating message to said broadcast device if the interactive text in said interactive text storage has no relevancy with the interactive content in the video data currently on display, wherein said second interactive text updating message is the interactive text having the third relevancy with the ID of said broadcast device, such interactive text is selected by said cloud server from the multiple interactive texts having the first relevancy with the current geographic position coordinate in said geographic position coordinate database according to the current geographic position coordinate of said broadcast device.

On the other hand, this invention further provides one broadcast device, said broadcast device comprises:

an interactive text request transmitting unit, configured to transmit the interactive text request message to the cloud server; said interactive text request message comprises the geographic position coordinate of said broadcast device, the preset quantity of interactive texts and the ID of the broadcast device;

an interactive text storage, configured to receive and store the interactive texts of a preset quantity from the cloud server;

a video data capturing unit, configured to capture video data; said video data comprise video and graphic data and multiple interactive contents; said interactive content comprises interactive information, display time of interactive text, first retained relevancy time of the interactive text and the coordinate information of display position, wherein said interactive contents are edited on the time point of the broadcast time axis of said video data;

a relating unit, configured to check the interactive content at the time point, select the interactive texts in the same quantity as the identified interactive content from said interactive text storage and establish the fourth relevancy with the identified content when said broadcast device is broadcasting said video data and reaches the time point when said interactive content is edited; and cancel the relevancy between said interactive text and said interactive content when the relevancy time of said interactive texts reaches the first retained relevancy time of the interactive content having the fourth relevancy therewith;

a video broadcast unit, configured to broadcast said video data, when said broadcast device is broadcasting said video data, it will display the interactive text having the fourth relevancy with the identified interactive content at the corresponding position on the screen of said broadcast device according to the displayed position coordinate information; when the display time of said interactive texts is the same as the display time of the interactive content having the fourth relevancy therewith, the display of such interactive text on the screen will be terminated;

an information transceiver unit, configured to receive the terminal's communication address and interactive text input information from the cloud server and transmit to said terminal the interactive information in the interactive content having relevancy with the interactive text in said interactive text input information.

In one embodiment, said video broadcast unit comprises one display submodule, configured to display the geographic scope of valid interaction of the interactive text shown on the screen beside the display position of said interactive text on the screen.

In one embodiment, the multiple interactive texts generated within the preset geographic scope of valid interaction corresponding to various geographic position coordinates are exclusive, as against the interactive texts that have the second relevancy with all the geographic position coordinates within said geographic scope of valid interaction.

In one embodiment, said video broadcast unit further comprises:

a first command receiving module, configured to receive the relevancy retention command and the first interactive text updating message from the cloud server, establish relevancy between said first interactive text updating message and the interactive content in the video data being broadcast and display it on the screen; according to said relevancy retention command, it retains the relevancy between said interactive content and the previous interactive text and cancels the display of the previous interactive text on the screen, wherein said first interactive text updating message is the interactive text having the third relevancy with the ID of said broadcast device; such interactive text is selected by said cloud server from the multiple interactive texts having the first relevancy with the current geographic position coordinate in said geographic position coordinate database according to the current geographic position coordinate of said broadcast device;

a second command receiving module, configured to receive the text replacement command and the second interactive text updating message; said broadcast device uses said second interactive text updating message to replace the interactive text stored in said interactive text storage according to said text replacement command, wherein said second interactive text updating message is the interactive text having the third relevancy with the ID of said broadcast device, such interactive text is selected by said cloud server from the multiple interactive texts having the first relevancy with the current geographic position coordinate in said geographic position coordinate database according to the current geographic position coordinate of said broadcast device.

On the other hand, this invention further provides one interaction system based on geographic position information, said interaction system comprises: a said cloud server and at least a said broadcast device and multiple terminals; wherein said terminal is configured to transmit to said cloud server an interactive text input command comprising interactive text input information and the geographic position coordinate and communication address of said terminal; said terminal is further configured to receive interactive information from said broadcast device and engage in the corresponding operations and display according to the type of said interactive information.

With this invention, a user can rapidly and conveniently acquire the interactive information in the interactive content in the video played on a broadcast device via a terminal.

DETAILED DESCRIPTION

A clear and complete description of the technical solution in an embodiment of this invention will be provided below. Obviously, the embodiment is only part of the embodiments of this invention. All other embodiments acquired by those with ordinary skills in the art without the need for inventive labors shall also be within the scope of protection of this invention.

Figure 1:
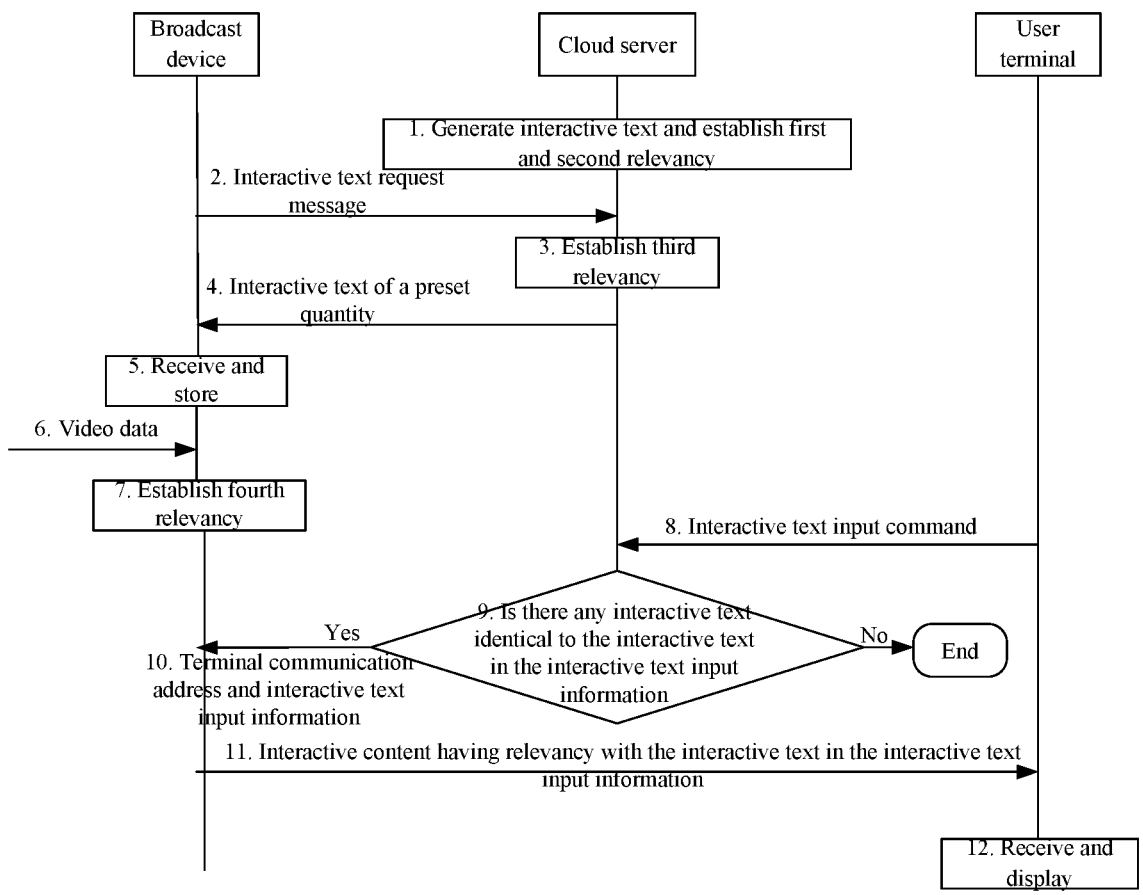
FIG. 1 shows the signaling diagram of the interaction method based on geographic position information of an embodiment of this invention.

This invention discloses an interaction method based on geographic position data. The signaling diagram of the interaction method is shown in FIG. 1 and the interaction method primarily comprises the following steps:

Step 1: The cloud server has the various geographic position coordinates in the geographic position coordinate database thereof as the central points, generates the corresponding multiple interactive texts for each geographic position coordinate within the preset geographic scope of the valid interactions, and establishes the first relevancy between said interactive texts and the corresponding geographic position coordinate and the second relevancy between said interactive texts and all the geographic position coordinates within said preset geographic scope of the valid interactions.

In the execution of the embodiment, one geographic position coordinate database is normally provided on the cloud server, said geographic position coordinate database stores all the geographic position coordinates within the jurisdiction, including the geographic position coordinates of all broadcast devices within the jurisdiction.

Step 2: Receive the interactive text request message from the broadcast device, wherein said interactive text request message comprises the geographic position coordinate of the broadcast device, the preset quantity of interactive texts and the ID of the broadcast device; wherein the geographic position coordinate of the broadcast device is already stored in the geographic position coordinate database. Normally, the ID of broadcast device contains the communication address of the broadcast device.

In the execution of the embodiment, such broadcast device may be a TV, computer, outdoor screen or onboard screen.

Step 3: According to the geographic position coordinate information in said interactive text request message, the cloud server selects all the interactive texts that have the first relevancy with the geographic position coordinates of the broadcast device from the geographic position coordinate database, and selects therefrom the interactive texts of a preset quantity that do not have relevancy with the ID of other broadcast devices, establishes the third relevancy between the selected interactive texts and the ID of the broadcast device.

In one embodiment, all the interactive texts having the first relevancy with the geographic position coordinate in the geographic position coordinate database have a single relevancy with the ID of the broadcast device, i.e. each interactive text can have the third relevancy with the ID of only one broadcast device. For instance, the preset quantity of the interactive texts in the interactive text request that the broadcast device sends to the cloud server is 5 but there are 20 interactive texts having the first relevancy with the geographic position coordinate of the broadcast device, wherein 5 of the interactive texts have established the third relevancy with the ID of other broadcast devices. In this case, the cloud server will select 5 of the remaining 15 interactive texts that haven't had the third relevancy with the ID of the broadcast device and establish the third relevancy between them and the ID of the broadcast device.

Step 4: The cloud server transmits the interactive texts of a preset quantity as selected in Step 3 to said broadcast device.

Step 5: Said broadcast device receives the interactive texts of the preset quantity from the cloud server and stores them in the interactive text storage.

Step 6: Said broadcast device acquires the video data; wherein said video data comprises video and image data and multiple interactive contents; each interactive content further comprises interactive information, display time of interactive text, first retained relevancy time of the interactive text and the coordinate information of display position, wherein the interactive contents are edited on the time point of the broadcast time axis of said video data.

Normally, said video data may originate from a video database or the Internet or a video editor.

Step 7: When the broadcast device is broadcasting said video data and reaches the time point when said interactive content is edited, it will check the interactive content at the time point, select the interactive texts in the same quantity as the identified interactive content from said interactive text storage and establish the fourth relevancy with the identified content; according to the displayed position coordinate information, the broadcast device will display the interactive text having the fourth relevancy with the identified interactive content at the corresponding position on the screen of said broadcast device; when the display time of said interactive texts is the same as the display time of the interactive content having the fourth relevancy therewith, the display of such interactive text on the screen will be terminated; when the relevancy time of said interactive texts reaches the first retained relevancy time of the interactive content having the fourth relevancy therewith, the relevancy between said interactive text and said interactive content will be cancelled.

In the execution of the embodiment, when said broadcast device is broadcasting said video data, the broadcast device will select the corresponding number of interactive texts from said interactive text storage according to the quantity of interactive contents in the current broadcast time point and establish one-to-one relevancy, i.e. the fourth relevancy, between such interactive texts and the corresponding number of interactive contents in the current broadcast time point; and display the interactive texts having relevancy therewith at the corresponding position on the screen of the broadcast device according to the display position coordinate information in the corresponding number of interactive contents.

In one embodiment, the interactive information in the interactive contents may be a web link, a telephone number and an address message. For instance, the broadcast device captures one advertisement video that contains 3 interactive contents. The interactive information in the 3 interactive contents are telephone number calling command, web link opening command and address navigation command. While playing the advertisement video, the broadcast device randomly selects 3 interactive texts 001, 010 and 100 from the interactive text storage and establishes relevancy between them and the 3 interactive contents, and displays them at the corresponding position in the screen according to the display position coordinate information in the 3 interactive contents.

The first relevancy retention time of said interactive text means that when the video of the interactive contents having the fourth relevancy with the interactive texts is finished, the broadcast device will retain the fourth relevancy between the interactive content and the interactive text within the first relevancy retention time. Said first relevancy retention time is a preset relevancy time. For instance, when the first relevancy retention time of one interactive text $a_1$ is set at 5 minutes, the broadcast device will retain the fourth relevancy between the interactive content and the interactive text $a_1$ for 5 minutes after the video containing the interactive contents having the fourth relevancy with the interactive texts is finished.

Step 8: The cloud server receives from the terminal the interactive text input command, wherein the interactive text input command comprises the interactive text input information, terminal's geographic position coordinate and communication address.

In the embodiment, the foregoing terminal may be a cell phone, a PDA, a tablet computer and other mobile terminals or a desktop computer and other fixed terminals.

Step 9: The cloud server checks the presence of any interactive text that is the same as the interactive text in said interactive text input information in the interactive text that has the second relevancy with the geographic position coordinate of the terminal; if it is present, it will go to the next step.

An interactive text input information normally contain interactive texts. In one embodiment, the cloud server retrieves said geographic position coordinate database and determines if there is any geographic position coordinate of the terminal in the geographic position coordinate database. If yes, the cloud server already generates multiple interactive texts for the geographic position coordinate in Step 1; the cloud server can search, in the interactive text having the second relevancy with the geographic position coordinate of the terminal, for any interactive text that is the same as the interactive text in the interactive text input information.

Step 10: It will transmit said terminal's communication address and interactive text input information to the corresponding broadcast device according to the ID of the broadcast device having the third relevancy with said same interactive text.

Step 11: Said broadcast device transmits to said terminal the interactive information in the interactive content having relevancy with the interactive text in said interactive text input information according to the terminal's communication address received from the cloud server.

Step 12: Said terminal receives said interactive information and performs the corresponding operations and displays according to the type of the interactive information.

This invention enables the user to use a terminal to rapidly and conveniently acquire the interactive information in the interactive contents of the video played by the broadcast device.

In an embodiment, the broadcast device may be a TV, a computer, an outdoor screen or other broadcast device; the interactive information may be a web link, a telephone number, an address or A/V data; the terminal may be a cell phone, a PDA, a tablet computer and other mobile terminals or a desktop computer and other non-mobile terminals. One smart phone will be adopted as the terminal for illustration for this invention. When the smart phone receives an interactive information and judges such information to be an address navigation information, it will automatically open the map navigation program to plan the navigational route from the current geographic position of the smart phone to the destination in the interactive information.

For the interaction method based on geographic position information of this invention, one embodiment is further provided as follows.

One broadcast device captures the video data of at least one interactive content and sends to the cloud server one interactive text request message, wherein said interactive text request message comprises the geographic position coordinate of the broadcast device, the options of the geographic scope of interaction based on its geographic position coordinate information, the quantity of interactive texts and the communication address and ID of the broadcast device.

After receipt of said interactive text request message, the cloud server will determine the corresponding geographic scope of interaction according to the geographic position coordinate of the broadcast device and the options of the geographic scope of interaction based on its geographic position coordinate information; it will further generate multiple interactive texts valid within said geographic scope of interaction according to one preset interactive text generation rule, make two duplicates of said valid interactive texts and write into one of the interactive texts the communication address and ID information of the broadcast device and the geographic scope of interaction in order to generate multiple interactive items and store them in the interactive item database; and then send the other interactive text to said broadcast device.

Upon receipt of said interactive texts, said broadcast device will relate said interactive texts to the corresponding number of interactive contents in the video data and store them in the interactive content storage. While playing said video data, it will display the corresponding interactive texts having relevancy with the interactive contents at the corresponding position of the broadcast device's screen according to the display position information of said interactive content.

Either the cloud server or the broadcast device can receive the interactive text input command from the terminal, identify the interactive content having relevancy with the interactive text information in said interactive text input command according to the interactive text input command and then send the interactive information in said interactive content to the terminal.

The terminal receives said interactive information and performs the corresponding operations and displays.

Said preset interactive text generation rules comprise: the cloud server determines the geographic scope where interactive texts will be generated and then identifies that the existing geographic scope of interaction partially or fully covers the interactive texts within the geographic scope where interactive texts will be generated; selects and generates, from one interactive text source database, multiple interactive texts that are exclusive and not repetitions of other existing interactive texts within said geographic scope of interaction, i.e. there is no overlapping of the geographic scopes of interaction of two identical interactive texts. For instance, the cloud server receives one interactive text request message from one broadcast device; when said interactive text request message requests the cloud server to generate 5 interactive texts valid within the designated geographic scope, the cloud server will determine the corresponding geographic scope of interaction according to the interactive text request message and then detect that the geographic scope of 10 interactive texts partially or fully cover the geographic scope of interaction. In this case, when it selects from the interactive text source database and generates 5 interactive texts, it will exclude the 10 interactive texts from the interactive text source database.

In one embodiment, the multiple interactive texts generated within the preset geographic scope of valid interaction corresponding to various geographic position coordinates are exclusive, as against the interactive texts that have the second relevancy with all the geographic position coordinates within said geographic scope of valid interaction.

Figure 2:
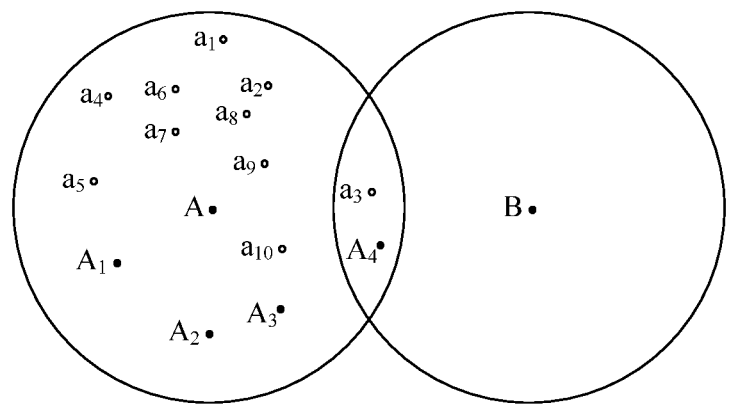
FIG. 2 shows the schematic diagram of the first relevancy and the second relevancy established for an embodiment of this invention.

FIG. 2 shows the schematic diagram of the first relevancy and the second relevancy established for one embodiment of the invention. The cloud server generates 10 interactive texts $a_1 \sim a_{10}$ within 100 m from Geographic Position Coordinate A in geographic position coordinate database (hereinafter referred to as Coordinate A), establishes the first relevancy between the 10 interactive texts and the corresponding Coordinate A and establishes the second relevancy between each of the 10 interactive texts (i.e. Coordinate A, $A_1$, $A_2$, $A_3$, $A_4$) and all coordinates within 100 m from Coordinate A. Each interactive text's exclusivity within 100 m from Coordinate A means that each interactive test (e.g. any of $a_2 \sim a_{10}$) is different from another interactive test having the second relevancy with all coordinates (i.e. Coordinate A, $A_1$, $A_2$, $A_3$, $A_4$) within this scope. Moreover, such exclusivity is also reflected in that Coordinate $A_4$ having the second relevancy with interactive texts $a_1 \sim a_{10}$ is within the circle having Coordinate A as the central point and also the circle having Coordinate B as the central point. As interactive texts $a_1 \sim a_{10}$ already have the second relevancy with Coordinate $A_4$, it is necessary to exclude interactive texts $a_1 \sim a_{10}$ while generating the interactive text having the first relevancy with Geographic Position Coordinate B.

In one embodiment, said broadcast device can also display the geographic scope of valid interaction of the interactive text shown on the screen beside the display position of said interactive text on the screen.

For instance, the geographic scope of valid interaction of Interactive Text $a_1$ shown on the screen of the broadcast device is 100 m from Geographic Position Coordinate A having the first relevancy with Interactive Text $a_1$ and the broadcast device will display radius 100 m beside the position of Interactive Text $a_1$.

In one embodiment, said interactive text may include one of FIGs, letters and characters or the combination thereof. For instance, the interactive text may be 01, AB, Zhang San, Al, Li A, etc.

The cloud server sets one valid display scope for the interactive texts having the first relevancy with the various geographic position coordinates in said geographic position coordinate database and the valid display scope of each interactive text is within the geographic scope of valid interaction corresponding to such interactive text and smaller than the corresponding geographic scope of valid interaction. When the geographic position coordinate of said broadcast device is beyond the valid display scope of the interactive text currently on display and having the fourth relevancy with a particular interactive content, the broadcast device will terminate display of the interactive text currently on display. For instance, the geographic scope of valid interaction of a particular Interactive Text $a_2$ is a circle in a radius of 100 m from Geographic Position Coordinate A having the first relevancy therewith. The valid display scope of the interactive text can be set within a circle in a radius of 50 m having Coordinate A as the central point.

The cloud server sets one second retained relevancy time for each interactive text having the first relevancy with the various geographic position coordinates in said geographic position coordinate database; when the geographic position coordinate of said broadcast device is beyond the valid display scope of the interactive text having the fourth relevancy with a particular interactive content in the second retained relevancy time, the cloud server will retain the third relevancy between the interactive text and the ID of said broadcast device within said geographic position coordinate database. For instance, the cloud server sets a second relevancy retention time of 10 minutes for Interactive Text $a_3$. When the broadcast device having the third relevancy with Interactive Text $a_3$ is beyond the valid display scope of Interactive Text $a_3$, the cloud server will retain the third relevancy between Interactive Text $a_3$ and the ID of the broadcast device within 10 minutes.

In one embodiment, said interaction method further comprises: the cloud server monitors changes in the geographic position coordinate of said broadcast device; when the geographic position coordinate of said broadcast device is beyond the valid display scope of the interactive text in said interactive text storage, the cloud server will identify the relevancy state of various interactive texts in said interactive text storage. There are primarily three relevancy states:

When the interactive text in said interactive text storage is related to the interactive content in the video data being broadcast and is being displayed on the screen, the third relevancy will be retained between the interactive text currently on display and the ID of said broadcast device within said second retained relevancy time and one relevancy retention command and one interactive text updating message will be sent to said broadcast device. Said interactive text updating message includes the new interactive texts that the cloud server selects from multiple interactive texts having the first relevancy with the current geographic position coordinate in the geographic position coordinate database according to the current geographic position coordinate of the broadcast device and that have the third relevancy with the ID of the broadcast device. According to the relevancy retention command, the broadcast device establishes relevancy between the new interactive texts in the interactive text updating message and the interactive contents in the video data currently on display and displays them at the corresponding position of the screen; retains the relevancy between the interactive contents of the video on display and the original interactive texts but cancels the display of the original interactive texts on the screen, i.e. both the original interactive texts and the new interactive texts retain their relevancy with the interactive contents of the video on display, but the screen displays the new interactive texts.

If the display of the interactive texts in the interactive text storage is already terminated but they still retain relevancy with the interactive content in the video data currently on display, the cloud server will retain the third relevancy between the interactive text and the ID of said broadcast device within said second relevancy retention time.

If the interactive text in the interactive text storage has no relevancy with the interactive content in the video data currently on display, the cloud server will cancel the third relevancy between the interactive text and the ID of said broadcast device, and send one text replacement command and one second interactive text updating message to said broadcast device. Said interactive text updating message includes the new interactive texts that the cloud server selects from multiple interactive texts having the first relevancy with the current geographic position coordinate in the geographic position coordinate database according to the current geographic position coordinate of the broadcast device and that have the third relevancy with the ID of the broadcast device. According to said text replacement command, the broadcast device replaces the interactive text originally stored in said interactive text storage with the new interactive text in the interactive text updating message.

For instance, the interactive text storage of the broadcast device stores 1 interactive text $a_4$; when the cloud server detects that one broadcast device S is beyond the valid display scope of Interactive Text $a_4$, it will identify the relevancy state of Interactive Text $a_4$. When Interactive Text $a_4$ is establishing relevancy with the interactive content of the video on display on Broadcast Device S and being shown on the screen, the third relevancy between the Interactive Text $a_4$ and the ID of Broadcast Device S in the geographic position coordinate database will be retained within one second relevancy retention time. Meanwhile, one relevancy retention command and one interactive text updating message will be sent to Broadcast Device S. Said interactive text updating message includes a new interactive text as that the cloud server selects from multiple interactive texts having the first relevancy with the current geographic position coordinate in the geographic position coordinate database according to the current geographic position coordinate of Broadcast Device S and that have the third relevancy with the ID of Broadcast Device S. Upon receipt of the interactive text updating message, Broadcast Device S will change the relevancy between Interactive Text $a_4$ and the interactive content of the video currently on display into background relevancy and cancel the display of Interactive Text $a_4$ on the screen according to the relevancy retention command; it will establish relevancy between the new Interactive Text $a_5$ and the interactive content and display the new Interactive Text as at the corresponding position of the screen according to the display position coordinate information in the interactive content, i.e. the current interactive content has relevancy with Interactive Text $a_4$ and as but the new Interactive Text as is shown on the screen. If the display of Interactive Text $a_4$ is already terminated but it still retains relevancy with a certain interactive content of the video currently on display, the cloud server will retain the third relevancy between Interactive Text $a_4$ and the ID of Broadcast Device S in the geographic position coordinate database within the second relevancy retention time. If Interactive Text $a_4$ does not retain relevancy with a certain interactive content of the video currently on display on Broadcast Device S, the cloud server will cancel the third relevancy between Interactive Text $a_4$ and the ID of Broadcast Device S in the geographic position coordinate database and send to Broadcast Device S one text replacement command and one interactive text updating message. Said interactive text updating message includes new Interactive Text $a_6$ that the cloud server selects from multiple interactive texts having the first relevancy with the current geographic position coordinate in the geographic position coordinate database according to the current geographic position coordinate of Broadcast Device S and that have the third relevancy with the ID of the broadcast device. According to said text replacement command, the broadcast device replaces Interactive Text $a_4$ originally stored in said interactive text storage with the new Interactive Text $a_6$ in the interactive text updating message, i.e. deleting original Interactive Text $a_4$.

In one embodiment, said geographic position coordinate comprises longitudinal and latitudinal coordinates and altitude information. For the purpose of execution, the longitudinal and latitudinal coordinates can be acquired via GPS positioning, IP address, celluar tower and Wifi connection. Altitude data can be acquired through barometric sensor or GPS positioning.

Based on the same invention concept as the interaction method based on geographic position information as shown in FIG. 1 and FIG. 2, the embodiment further discloses one cloud server, as shown in the following embodiment. As this cloud server solves problems according to similar principles with the cloud server applied in the interaction method based on geographic position information, refer to the implementation of the interaction method based on geographic position information for the implementation of the cloud server. The repeated contents are ignored here.

Figure 3:
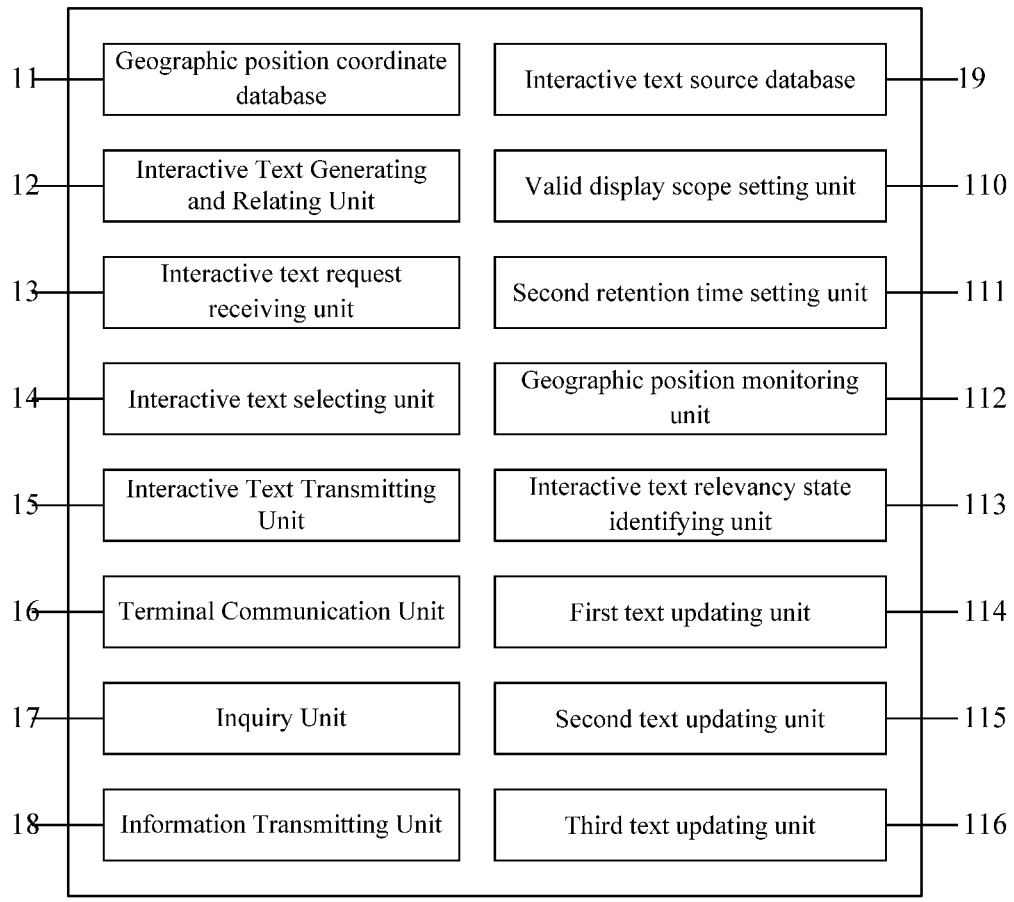
FIG. 3 shows the structural diagram of the cloud server of an embodiment of this invention.

FIG. 3 is the structural diagram of the cloud server in an embodiment of the invention. As FIG. 3 shows, the cloud server comprises: Geographic Position Coordinate Database 11, Interactive Text Generating and Relating Unit 12, Interactive Text Request Receiving Unit 13, Interactive Text Selecting Unit 14, Interactive Text Transmitting Unit 15, Terminal Communication Unit 16, Inquiry Unit 17 and Information Transmitting Unit 18.

Geographic Position Coordinate Database 11, configured to store all the geographic position coordinate information within the target area, including the geographic position coordinate information of all broadcast devices within the target area.

Interactive Text Generating and Relating Unit 12, configured to have the various geographic position coordinates in Geographic Position Coordinate Database 11 as the central points, generate the corresponding multiple interactive texts for each geographic position coordinate within the preset geographic scope of the valid interactions and establish the first relevancy between said interactive texts and the corresponding geographic position coordinate and the second relevancy between said interactive texts and all the geographic position coordinates within said preset geographic scope of the valid interactions.

Interactive Text Request Receiving Unit 13, configured to receive the interactive text request message from the broadcast device; wherein said interactive text request message comprises the geographic position coordinate of said broadcast device, the preset quantity of interactive texts and the ID of the broadcast device.

Interactive Text Selecting Unit 14, configured to select all the interactive texts that have the first relevancy with the geographic position coordinates of the broadcast device from said Geographic Position Coordinate Database 11, select therefrom the interactive texts of a preset quantity that do not have relevancy with the ID of other broadcast devices, establish the third relevancy between the selected interactive texts and the ID of the broadcast device.

Interactive Text Transmitting Unit 15, configured to transmit the selected interactive texts of the preset quantity to said broadcast device.

Terminal Communication Unit 16, configured to receive from the terminal the interactive text input command that comprises the interactive text input information, terminal's geographic position coordinate and communication address.

Inquiry Unit 17, configured to check the presence of any interactive text that is the same as the interactive text in said interactive text input information in the interactive text that has the second relevancy with the geographic position coordinate of the terminal.

Information Transmitting Unit 18, configured to transmit said terminal's communication address and interactive text input information to the corresponding broadcast device according to the ID of the broadcast device having the third relevancy with said same interactive text if there is any interactive text that is the same as the interactive text in said interactive text input information.

In one embodiment, said cloud server further comprises: Interactive Text Source Database 19, configured to provide the interactive texts when said Interactive Text Generating and Relating Unit 12 is generating the corresponding multiple interactive texts for each geographic position coordinate in said Geographic Position Coordinate Database 11.

In one embodiment, said cloud server comprises one Valid Display Scope Setting Unit 110, configured to set one valid display scope for the interactive texts having the first relevancy with the various geographic position coordinates in said Geographic Position Coordinate Database 11; the valid display scope of each interactive text is within the geographic scope of valid interaction corresponding to the interactive text. When the geographic position coordinate of said broadcast device is beyond the valid display scope of the interactive text currently on display, said broadcast device will terminate display of the interactive text currently on display.

In one embodiment, said cloud server further comprises: a Second Retention Time Setting Unit 111, configured to set one second retained relevancy time for the interactive texts having the first relevancy with the various geographic position coordinates in said Geographic Position Coordinate Database 11. When the geographic position coordinate of said broadcast device is beyond the valid display scope of the interactive text currently on display, the third relevancy will be retained between the interactive text currently on display and the ID of said broadcast device within said second retained relevancy time.

In one embodiment, said cloud server further comprises: Geographic Position Monitoring Unit 112 and Interactive Text Relevancy State Identifying Unit 113, wherein Geographic Position Monitoring Unit 112 is configured to monitor any changes in the geographic position of the broadcast device on a real-time basis; and Interactive Text Relevancy State Identifying Unit 113 is configured to identify the relevancy state of various interactive texts in said interactive text storage when the geographic position coordinate of said broadcast device is beyond the valid display scope of the interactive text in said interactive text storage.

In one embodiment, said cloud server further comprises: First Text Updating Unit 114, Second Text Updating Unit 115 and Third Text Updating Unit 116.

First Text Updating Unit 114, configured to retain the third relevancy between the interactive text currently on display and the ID of said broadcast device within said second relevancy retention time when the interactive text in said interactive text storage is related to the interactive content of the video data being broadcast and is being displayed on the screen, and also send one relevancy retention command and one first interactive text updating message to said broadcast device, wherein said first interactive text updating message is the interactive text having the third relevancy with the ID of said broadcast device; such interactive text is selected by said cloud server from the multiple interactive texts having the first relevancy with the current geographic position coordinate in said geographic position coordinate database according to the current geographic position coordinate of said broadcast device.

Second Text Updating Unit 115, configured to retain the third relevancy between the interactive text of said interactive text storage and the ID of said broadcast device within said second relevancy retention time when the display of the interactive texts in said interactive text storage is already terminated but they still retain relevancy with the interactive content in the video data currently on display.

Third Text Updating Unit 116, configured to cancel the third relevancy between the interactive text in said interactive text storage and the ID of said broadcast device and send one text replacement command and one second interactive text updating message to said broadcast device if the interactive text in said interactive text storage has no relevancy with the interactive content in the video data currently on display, wherein said second interactive text updating message is the interactive text having the third relevancy with the ID of said broadcast device. Such interactive text is selected by said cloud server from the multiple interactive texts having the first relevancy with the current geographic position coordinate in said Geographic Position Coordinate Database 11 according to the current geographic position coordinate of said broadcast device.

Based on the same invention concept as the interaction method based on geographic position information as shown in FIG. 1 and FIG. 2, the embodiment further discloses one broadcast device, as the following embodiment shows. As this broadcast device solves problems according to similar principles with the broadcast device applied in the interaction method based on geographic position information, refer to the implementation of the interaction method based on geographic position information for the implementation of the broadcast device. The repeated contents are ignored here.

Figure 4:
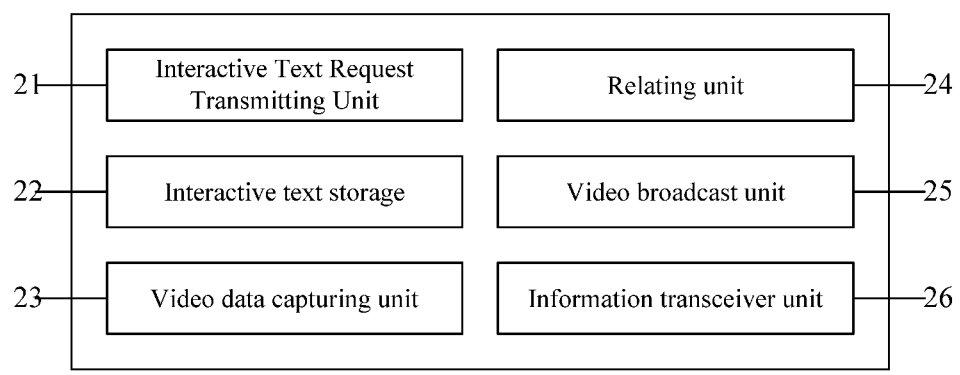
FIG. 4 shows the structural diagram of the broadcast device of an embodiment of this invention.

FIG. 4 shows the structural diagram of the broadcast device of one embodiment of the invention. As FIG. 4 shows, said broadcast device comprises: Interactive Text Request Transmitting Unit 21, Interactive text storage 22, Video Data Capturing Unit 23, Relating Unit 24, Video Broadcast Unit 25 and Information Transceiver Unit 26.

Interactive Text Request Transmitting Unit 21, configured to transmit the interactive text request message to the cloud server; wherein said interactive text request message comprises the geographic position coordinate of said broadcast device, the preset quantity of interactive texts and the ID of the broadcast device.

Interactive text storage 22, configured to receive and store the interactive texts of a preset quantity from the cloud server.

Video Data Capturing Unit 23, configured to capture video data, wherein said video data comprise video and image data and multiple interactive contents; each interactive content comprises interactive information, display time of interactive text, first retained relevancy time of the interactive text and the coordinate information of display position, wherein said interactive contents are edited on the time point of the broadcast time axis of said video data.

Relating Unit 24, configured to check the interactive content at the time point, select the interactive texts in the same quantity as the identified interactive content from said Interactive Text Storage 22 and establish the fourth relevancy with the identified content when said broadcast device is broadcasting said video data and reaches the time point when said interactive content is edited; and cancel the relevancy between said interactive text and said interactive content when the relevancy time of said interactive texts reaches the first retained relevancy time of the interactive content having the fourth relevancy therewith;

Video Broadcast Unit 25, configured to broadcast said video data. When said broadcast device is broadcasting said video data, it will display the interactive text having the fourth relevancy with the identified interactive content at the corresponding position on the screen of said broadcast device according to the displayed position coordinate information; when the display time of said interactive texts is the same as the display time of the interactive content having the fourth relevancy therewith, the display of such interactive text on the screen will be terminated.

Information Transceiver Unit 26, configured to receive the terminal's communication address and interactive text input information from the cloud server and transmit to said terminal the interactive information in the interactive content having relevancy with the interactive text in said interactive text input information according to said terminal's communication address.

In one embodiment, said Video Broadcast Unit 25 comprises one Display Submodule 251, configured to display the geographic scope of valid interaction of the interactive text shown on the screen beside the display position of said interactive text on the screen.

Normally, the multiple interactive texts generated within the preset geographic scope of valid interaction corresponding to various geographic position coordinates are exclusive, as against the interactive texts that have the second relevancy with all the geographic position coordinates within said geographic scope of valid interaction.

Figure 5:
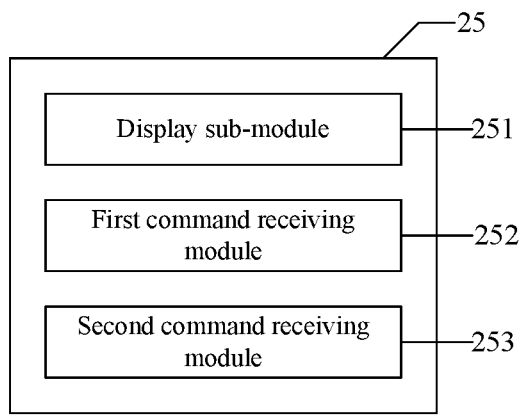
FIG. 5 shows the structural diagram of video broadcast unit 24 of an embodiment of this invention.

In one embodiment, as FIG. 5 shows, said Video Broadcast Unit 25 further comprises: First Command Receiving Module 252 and Second Command Receiving Module 253.

First Command Receiving Module 252 is configured to receive the relevancy retention command and the first interactive text updating message from the cloud server, establish relevancy between said first interactive text updating message and the interactive content in the video data being broadcast and display it on the screen. According to said relevancy retention command, it retains the relevancy between said interactive content and the previous interactive text and cancels the display of the previous interactive text on the screen, wherein said first interactive text updating message is the interactive text having the third relevancy with the ID of said broadcast device; such interactive text is selected by said cloud server from the multiple interactive texts having the first relevancy with the current geographic position coordinate in said Geographic Position Coordinate Database 11 according to the current geographic position coordinate of said broadcast device.

Second Command Receiving Module 253 is configured to receive the text replacement command and the second interactive text updating message; said broadcast device uses said second interactive text updating message to replace the interactive text stored in said Interactive text storage 22 according to said text replacement command, wherein said second interactive text updating message is the interactive text having the third relevancy with the ID of said broadcast device. Such interactive text is selected by said cloud server from the multiple interactive texts having the first relevancy with the current geographic position coordinate in said Geographic Position Coordinate Database 11 according to the current geographic position coordinate of said broadcast device.

In one embodiment, the broadcast device may be a TV, a computer and an outdoor display or a combination thereof.

Based on the same invention concept as the interaction method based on geographic position information as shown in FIG. 1 and FIG. 2, the embodiment further discloses one interaction system based on geographic position information, as the following embodiment shows. As this interaction system based on geographic position information solves problems according to similar principles with the interaction method based on geographic position information, refer to the implementation of the interaction method based on geographic position information for the implementation of the interaction system based on geographic position data. The repeated contents are ignored here.

Figure 6:
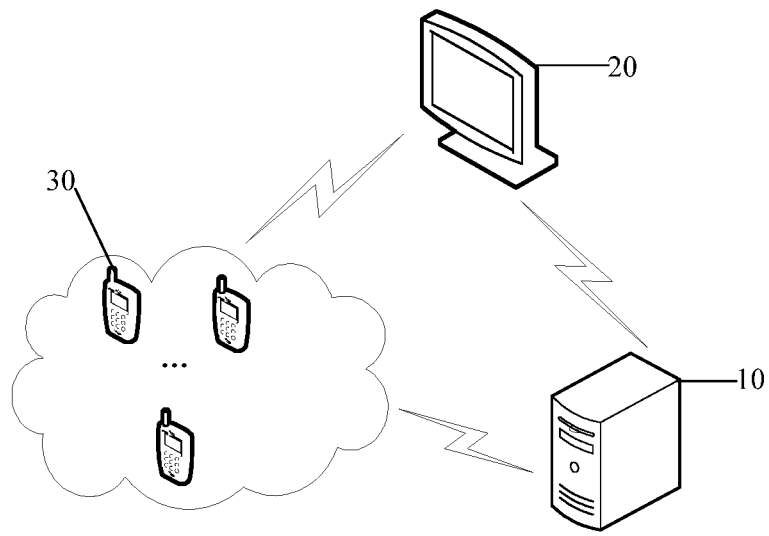
FIG. 6 shows the structural diagram of the interaction system based on geographic position information of an embodiment of this invention.

FIG. 6 shows the structural diagram of the interaction system based on geographic position information in one embodiment of the invention. As FIG. 6 shows, said interaction system comprises: Cloud Server 10, at least a Broadcast Device 20 and multiple Terminals 30. See FIG. 3 for the structure of Cloud Server 10 and FIG. 4 for the structural diagram of Broadcast Device 20.

Terminal 30 is configured to send to Cloud Server 10 an interactive text input command that comprises an interactive text input information and the geographic position coordinate and communication address of Terminal 30. It is further configured to receive the interactive information from Broadcast Device 20 and perform the corresponding operations and displays according to the type of the interactive information.

Figure 7:
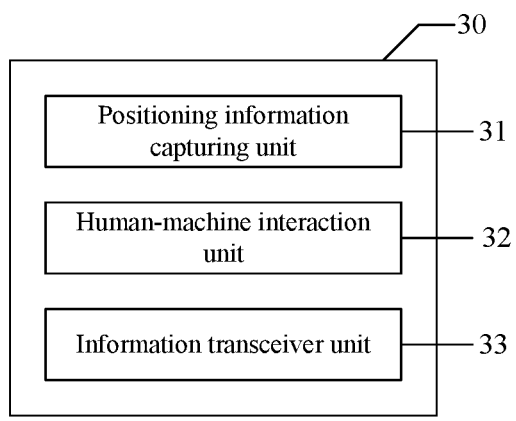
FIG. 7 shows the structural diagram of terminal 30 of an embodiment of this invention.

As FIG. 7 shows, in one embodiment, Terminal 30 normally comprises: Positioning Information Capturing Unit 31, Human-machine Interaction Unit 32 and Information Transceiver Unit 33.

Positioning Information Capturing Unit 31 is configured to capture the geographic position coordinate of the terminal. Human-machine Interaction Unit 32 is configured to capture the interactive text input information input by the user. Information Transceiver Unit 33 is configured to transmit to Cloud Server 10 an interactive text input command containing interactive text input information and the geographic position coordinate and communication address of Terminal 30. It is further configured to receive the interactive information from Broadcast Device 20. Human-machine Interaction Unit 32 performs the corresponding operations and displays according to the type of the interactive information.

The interactive information that Terminal 30 receives may be one command, e.g. one navigational command that automatically starts the map navigation application in the terminal for navigation from the current coordinate of the terminal to a particular place, or a text, e.g. a photo.

In one embodiment, said Information Transceiver Unit 33 may be a Wifi module or a bluetooth module, or a GPS module and other functional modules used for wireless communication.

In a specific embodiment, where Terminal 30 is a tablet computer which receives the interactive information from the broadcast device and judges that the interactive information is a song, it will start the corresponding program and play the song. In another embodiment, where Terminal 30 is an onboard navigator which receives the interactive information from the broadcast device and judges that the interactive information is a piece of address information, it will start the navigation program and plan the route leading to the destination.

In summary, the interaction method, cloud server, broadcast device and interaction system based on geographic position information as disclosed in one embodiment of this invention enables a user to rapidly and conveniently acquire the interactive information in the interactive contents on the broadcast device via a terminal and thus brings very good user experiences.

Those with common skills in this area shall understand that the embodiment of this invention may take the form of a method, a system or a computer program product. Therefore, this invention may be reflected in a full hardware embodiment, a full software embodiment or a combination thereof. Moreover, the invention may take the form of a computer program product that is executed on one or multiple computer-operated storage media (including but not limited to disk storage, CD-ROM, optical storage, etc.) that contain computer programming code.

The foregoing embodiments provide further details on the purposes, technical solution and beneficial effects of the invention. It is understood that the foregoing embodiments are specific embodiments of this invention and shall not limit the scope of protection of the invention. All amendments, equivalent substitutions and improvements made within the spirits and principles of this invention shall be included in the scope of protection of this invention.

The invention claimed is:

1. An interaction method based on geographic position information, said interaction method comprises:

generating, at a cloud server having various geographic position coordinates in a geographic position coordinate database thereof as central points, corresponding multiple interactive texts for each geographic position coordinate within a preset geographic scope of a valid interaction and establishing a first relevancy between said interactive texts and corresponding geographic position coordinate and a second relevancy between said interactive texts and all geographic position coordinates within said preset geographic scope of the valid interaction;

receiving at the cloud server an interactive text request message from a broadcast device; said interactive text request message comprising a geographic position coordinate of the broadcast device, a preset quantity of interactive texts, and an ID of the broadcast device;

selecting, at the cloud server according to the geographic position coordinate in said interactive text request message, all interactive texts that have the first relevancy with the geographic position coordinate of the broadcast device from said geographic position coordinate database, and selecting therefrom interactive texts of a preset quantity that do not have relevancy with the IDs of other broadcast devices, establishing a third relevancy between the selected interactive texts and the ID of the broadcast device and transmitting them to said broadcast device;

receiving, at the broadcast device, the interactive texts of the preset quantity and storing them in an interactive text storage;

acquiring, at the broadcast device, video data, said video data comprising video image data and multiple interactive contents, said interactive content comprising interactive information, display time of interactive text, first retained relevancy time of the interactive text, and a coordinate information of display position, wherein the interactive contents are edited on the time point of a broadcast time axis of said video data;

checking, when said broadcast device is broadcasting said video data and reaches the time point when said interactive content is edited, the interactive content at the time point, selecting interactive texts in the same quantity as the identified interactive content from said interactive text storage and establishing a fourth relevancy with the identified interactive content; displaying, according to the coordinate information of display position, the interactive texts having the fourth relevancy with the identified interactive content at corresponding position on a screen of said broadcast device; terminating, when the display time of said interactive texts reaches the display time of the interactive content having the fourth relevancy therewith, the display of said interactive texts on the screen; cancelling, when the relevancy time of said interactive texts reaches the first retained relevancy time of the interactive content having the fourth relevancy therewith, the relevancy between said interactive texts and said interactive content;

receiving, at said cloud server from a terminal, an interactive text input command that comprises interactive text input information, terminal's geographic position coordinate and communication address and checking a presence of any interactive text that is the same as the interactive text in said interactive text input information in the interactive text having the second relevancy with the geographic position coordinate of the terminal; transmitting, if it is present, said terminal's communication address and the interactive text input information to corresponding broadcast device according to the ID of the broadcast device having the third relevancy with said same interactive text;

transmitting from said broadcast device to said terminal, the interactive information in the interactive content having relevancy with the interactive text in said interactive text input information according to the communication address of said terminal;

receiving, at said terminal, said interactive information and performing corresponding operations and displaying said interactive information according to the type of said interactive information.

2. The interaction method of claim 1, the interaction method further comprises: displaying, at said broadcast device, the geographic scope of valid interaction of the interactive text shown on the screen beside the display position of said interactive text on the screen.

3. The interaction method of claim 1, wherein the multiple interactive texts generated within the preset geographic scope of valid interaction corresponding to various geographic position coordinates are exclusive, as against the interactive texts that have the second relevancy with all the geographic position coordinates within said geographic scope of valid interaction.

4. The interaction method of claim 1, the interaction method further comprises: setting, at said cloud server, a valid display scope for the interactive texts having the first relevancy with the various geographic position coordinates in said geographic position coordinate database, wherein the valid display scope of each interactive text is within the geographic scope of valid interaction corresponding to said interactive text; terminating, at said broadcast device when the geographic position coordinate of said broadcast device is beyond the valid display scope of the interactive text currently on display, display of the interactive text currently on display.

5. The interaction method of claim 4, the interaction method further comprises: setting, at said cloud server, a second retained relevancy time for the interactive texts having the first relevancy with the various geographic position coordinates in said geographic position coordinate database; retaining, when the geographic position coordinate of said broadcast device is beyond the valid display scope of the interactive text currently on display, the third relevancy between the interactive text currently on display and the ID of said broadcast device within said second retained relevancy time.

6. The interaction method of claim 5, the interaction method further comprises: monitoring, at said cloud server, changes in the geographic position coordinate of said broadcast device on a real-time basis, identifying, when the geographic position coordinate of said broadcast device is beyond the valid display scope of the interactive text in said interactive text storage, the relevancy state of various interactive texts in said interactive text storage;

Wherein if the interactive text in said interactive text storage is related to the interactive content in the video data being broadcasted and is being displayed on the screen, the third relevancy is retained between the interactive text currently on display and the ID of said broadcast device within said second retained relevancy time, and a relevancy retention command and a first interactive text updating message are sent to said broadcast device; said broadcast device receives the relevancy retention command and the first interactive text updating message, establishes relevancy between said first interactive text updating message and the interactive content in the video data being broadcast and displays it on the screen, and according to said relevancy retention command, it retains the relevancy between said interactive content and the previous interactive text and cancels the display of the previous interactive text on the screen; wherein said first interactive text updating message is the interactive text having the third relevancy with the ID of said broadcast device, said interactive text is selected by said cloud server from the multiple interactive texts having the first relevancy with the current geographic position coordinate in said geographic position coordinate database according to the current geographic position coordinate of said broadcast device;

if the display of the interactive texts in said interactive text storage is already terminated but they still retain relevancy with the interactive content in the video data currently on display, the third relevancy between the interactive text of said interactive text storage and the ID of said broadcast device are retained within said second retained relevancy time;

if the interactive text in said interactive text storage has no relevancy with the interactive content in the video data currently on display, the third relevancy between the interactive text in said interactive text storage and the ID of said broadcast device are cancelled, meanwhile, a text replacement command and a second interactive text updating message are sent to said broadcast device; said broadcast device uses said second interactive text updating message to replace the interactive text stored in said interactive text storage according to said text replacement command, wherein said second interactive text updating message is the interactive text having the third relevancy with the ID of said broadcast device, said interactive text is selected by said cloud server from the multiple interactive texts having the first relevancy with the current geographic position coordinate in said geographic position coordinate database according to the current geographic position coordinate of said broadcast device.

7. The interaction method of claim 1, wherein said geographic position coordinate comprises: longitudinal and latitudinal coordinates and altitude data.

8. The interaction method of claim 1, where said interactive text, includes at least one of figures, letters and characters.

* * * * *